United States Patent
Sachs et al.

(10) Patent No.: US 8,891,510 B2
(45) Date of Patent: Nov. 18, 2014

(54) COMMUNICATION SYSTEM AND METHOD FOR ACCESSING A NETWORK BY A GROUP OF FIRST ACCESS PATHS AND A GROUP OF SECOND ACCESS PATHS

(75) Inventors: Joachim Sachs, Aachen (DE); Per Olof Magnus Magnusson, Linkoping (SE); Mikael Prytz, Ronninge (SE); Johan Lundsjo, Spanga (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 494 days.

(21) Appl. No.: 11/997,690

(22) PCT Filed: Aug. 5, 2005

(86) PCT No.: PCT/EP2005/008515
§ 371 (c)(1),
(2), (4) Date: Feb. 1, 2008

(87) PCT Pub. No.: WO2007/016940
PCT Pub. Date: Feb. 15, 2007

(65) Prior Publication Data
US 2008/0225829 A1    Sep. 18, 2008

(51) Int. Cl.
*H04L 12/28* (2006.01)
*G06F 15/16* (2006.01)
*H04W 48/18* (2009.01)
*H04W 88/06* (2009.01)

(52) U.S. Cl.
CPC .............. *H04W 48/18* (2013.01); *H04W 88/06* (2013.01)
USPC .......................................... 370/351; 709/250

(58) Field of Classification Search
USPC ........................................... 709/250; 370/351
See application file for complete search history.

(56) References Cited

U.S. PATENT DOCUMENTS

| 4,991,204 A | * | 2/1991 | Yamamoto et al. | ...... 379/221.01 |
| 6,058,422 A | * | 5/2000 | Ayanoglu et al. | ............. 709/226 |
| 7,089,009 B1 | * | 8/2006 | Fauconnier | .................... 455/445 |
| 7,162,250 B2 | * | 1/2007 | Misra | ............................ 455/453 |

(Continued)

FOREIGN PATENT DOCUMENTS

| EP | 0 812 119 A2 | 10/1997 | |
| EP | 1 424 862 A | 6/2004 | |
| WO | WO02104054 | * 12/2002 | ............... H04Q 7/36 |
| WO | WO 03/094559 A | 11/2003 | |

OTHER PUBLICATIONS

Sigle R (Alcatel): "MRA Architecture, Mobile and Wireless Systems beyond 3G" Ambient Networks Specification, Feb. 17, 2005. p. 4, line 5-line 32; p. 14, line 6-line 21; p. 16, line 4-line 31; p. 20, line 3-line 7; p. 35, line 20-line 27; p. 37, line 7—p. 30, line 19.

*Primary Examiner* — Gerald Smarth

(57) ABSTRACT

A communication system is provided which is arranged for accessing a network by a group of first access paths and a group of second access paths. The first and second access paths have a different access technology. An access path monitor is provided for obtaining status information related to the access paths in accordance with the monitoring procedure. An access controller is provided for selecting an access path for a communication session in accordance with a selection procedure and in dependence on the status information. A modifier is provided for modifying one or both of the monitoring procedure and the selection procedure in accordance with a modification procedure and in dependence on decision information.

28 Claims, 3 Drawing Sheets

(56) References Cited

U.S. PATENT DOCUMENTS

| | | | |
|---|---|---|---|
| 7,440,573 B2* | 10/2008 | Lor et al. | 380/270 |
| 2002/0048268 A1* | 4/2002 | Menon et al. | 370/349 |
| 2002/0093922 A1* | 7/2002 | Grilli et al. | 370/328 |
| 2002/0105974 A1* | 8/2002 | Cheng et al. | 370/510 |
| 2003/0179756 A1* | 9/2003 | Cain | 370/395.42 |
| 2003/0191856 A1* | 10/2003 | Lewis et al. | 709/241 |
| 2004/0037222 A1 | 2/2004 | Kim et al. | |
| 2004/0090943 A1* | 5/2004 | da Costa et al. | 370/338 |
| 2004/0132486 A1* | 7/2004 | Halonen et al. | 455/552.1 |
| 2004/0153525 A1* | 8/2004 | Borella | 709/217 |
| 2004/0229621 A1* | 11/2004 | Misra | 455/445 |
| 2004/0246940 A1* | 12/2004 | Kubler et al. | 370/351 |
| 2005/0153695 A1* | 7/2005 | Cho | 455/436 |
| 2005/0239498 A1* | 10/2005 | Dorenbosch et al. | 455/552.1 |
| 2006/0013235 A1* | 1/2006 | Farnham | 370/401 |
| 2006/0046659 A1* | 3/2006 | Haartsen et al. | 455/67.11 |
| 2006/0084417 A1* | 4/2006 | Melpignano et al. | 455/418 |
| 2007/0041330 A1* | 2/2007 | Bostica et al. | 370/252 |

* cited by examiner

COMMUNICATION SYSTEM AND METHOD FOR ACCESSING A NETWORK BY A GROUP OF FIRST ACCESS PATHS AND A GROUP OF SECOND ACCESS PATHS

CLAIM OF PRIORITY

This application is a 371 of PCT/EP05/08515 filed on Aug. 5, 2005, the disclosure of which is fully incorporated herein by reference.

FIELD OF THE INVENTION

The present invention relates to a communication system for accessing a network via a group of first access paths of a first access technology and a group of second access paths of a second access technology, said second access technology being different from the first access technology. The application also relates to a method of network access via access paths of different access technology.

BACKGROUND OF THE INVENTION

In the field of communications it is known to provide systems in which a given device can obtain access to a network via access paths of differing access technology. This is shown schematically in FIG. 2. A communication system 10, e.g. a wireless communication device such as a mobile telephone is able to communicate with stations 11 and 12 that provide communication paths 101, 102 of a first access technology, e.g. a GSM (Global System for Mobile Communication) connection, a WCDMA (Wideband CDMA) connection, a WiMAX (Worldwide Interoperability for Microwave Access) connection, a WINNER (Wireless World Initiative New Radio) connection, a WLAN (Wireless Local Area Network) connection, etc. The communication system 10 can furthermore communicate with stations 13, 14 over communication paths 103, 104 that are of a different access technology than paths 101, 102. If the paths 101, 102 operate in accordance with one of the above-mentioned technologies, then the paths 103, 104 can be provided by any one of the other technologies. The communication system 10 accesses the network 15, e.g. a telephone network or a computer network, such as an intranet or the Internet via the paths 101-104.

If the stations 11-14 and the communication system 10 are arranged in such a way that the communication system 10 can from one location access the network 15 via both an access path 101, 102 or 103, 104, then this leads to the problem of managing the selection of one or more paths for conducting a communication session with the network 15.

The basic situation of having heterogeneous wireless technologies for communication in a given location has already been studied, e.g. in the context of so-called Ambient Networks (AN), see document ISD-2002-507134-AN/WB2/D02, MRA Architecture by Rolf Sigle et al, version 1.0, released Feb. 2, 2005. The inventors of the present application are also authors/editors of this document, the contents of which is herewith incorporated by reference.

In the context of Ambient Networks it has been proposed to use so-called Multi-Radio Resource Management (MRRM) for managing the different access technologies. An MRRM functionality coordinates the different radio access technologies by mapping service requests on available radio resources for both single- and multi-hop links. Different MRRM objectives can be used e.g. maximizing radio resource efficiency, service coverage or service quality, or enabling services otherwise impossible to deliver over a single radio access. Intelligent load distribution algorithms inside MRRM increase the overall effective network capacity. MRRM functions include advertising, discovery, selection, resource monitoring, and spectrum and congestion control. By monitoring the access paths and obtaining status information related to access paths of different access technology, an access controller can select an access path for a communication session in accordance with a selection procedure and in dependence of the status information.

Document EP 0 812 119 A2 discusses an improvement of the idle or standby mode in mobile stations of a cellular communication system. It is mentioned that the IS-136 and the GSM standard require an idle mobile station, i.e. a mobile station that is not in the process of conducting a communication session, to monitor control channels of neighbouring cells. EP 0 812 119 A2 proposes a different standby mode according to which when making measurements of a currently assigned control channel and other control channels, measurements of at least some of the other control channels can be terminated if it is detected that the mobile station has become stationary. The latter can be done by measuring the received signal strength of a monitored neighbouring channel and comparing the temporal change in signal strength with a predetermined threshold. If the change in received signal strength falls below this threshold it is determined that the mobile station is stationary.

OBJECT OF THE INVENTION

The object of the invention is to provide an improved communication system and method of accessing a network via groups of access paths of different access technology. It is noted that this object is not restricted to systems having wireless access technology, as the problem of making a selection between access paths of different technology will also occur if one or more of the groups of access paths are wire-bound.

SUMMARY OF THE INVENTION

The object of the invention is fulfilled by a communication system having the features of claims 1 and 28, a modifier having the features of claim 23, a method of controlling access to a network according to claim 24, and a computer program product of claim 25. Advantageous embodiments are described in the dependent claims.

In accordance with the present invention a communication system arranged for accessing a network via a group of first access paths of a first access technology and a group of second access paths of a second access technology different from the first access technology is provided. The communication system can be a terminal, such as a mobile telephone capable of communication in accordance with a variety of wireless technologies, or the communication system can itself be a network, such as a Personal Area Network. The group of first access paths can have one or more members, and the group of second access paths can have one or more members. Naturally, the communication system can be arranged for accessing a network via more than two different types of access technologies.

An access path monitor is provided for obtaining status information related to a status of one or more of the first access paths and one or more of the second access paths in accordance with a monitoring procedure. The obtaining of information can e.g. be done by performing measurements on the access paths of interest, or can be obtained in other ways, e.g. received from the network. It is noted that the term "access path" describes any suitable access connection, e.g. a single link, a number of consecutive links, or an entire sub-network.

Furthermore, an access controller is provided for selecting an access path for a communication session from among the first and second access paths in accordance with a selection procedure and in dependence on the status information obtained by the access path monitor. The selecting preferably not only comprises the initial selection of one or more paths for a given session that is to be established, but also the subsequent switching of an established session from an access path of the first access technology to an access path of the second technology or vice versa, while the communication session is active.

Furthermore, in accordance with the invention a modifier for modifying one or both of the monitoring procedure and the selection procedure in accordance with a modification procedure and in dependence on decision information is provided. The modifying can be done in any suitable or desirable way e.g. by changing parameters used by a procedure, e.g. the frequency at which status information is obtained. Modifying may also comprise changing a procedure or routine itself, e.g. by switching from one subroutine or mode to another.

In accordance with the present invention, the monitoring procedure and/or the selection procedure can be flexibly and dynamically adapted by the modification procedure. This provides an optimised management of the access paths of differing technology. More specifically, it is possible to control the modification in such a way so as to optimise the trade-off between the costs (e.g. in terms of signalling overhead, energy consumption etc.) caused by the monitoring procedure and the benefit (e.g. in terms of improved quality of service) provided by the selection procedure. The balancing of cost and benefit can be done without actually calculating a cost value or a benefit value, e.g. by simply analysing a predetermined criterion for which the cost and benefit balance was previously established. An example of this is to stop the measurement of status information on access paths under observation if the power supply of the communication system is below a predetermined threshold and the signal quality on the active access path is above a predetermined threshold, as in such a case the cost in terms of energy is considered to outweigh any benefit in improved communication quality. On the other hand, it is also possible to explicitly calculate a cost value and/or a benefit value, e.g. based on mathematical functions or on appropriate look-up tables, and to then modify the monitoring and/or selection procedure in accordance with the cost value, benefit value or the relationship between the cost and benefit values.

BRIEF DESCRIPTION OF FIGURES

These and further advantages of the present invention will become more apparent from the following description of preferred embodiments, which makes reference to the enclosed figures in which.

DETAILED DESCRIPTION OF EMBODIMENTS

Figure 1:
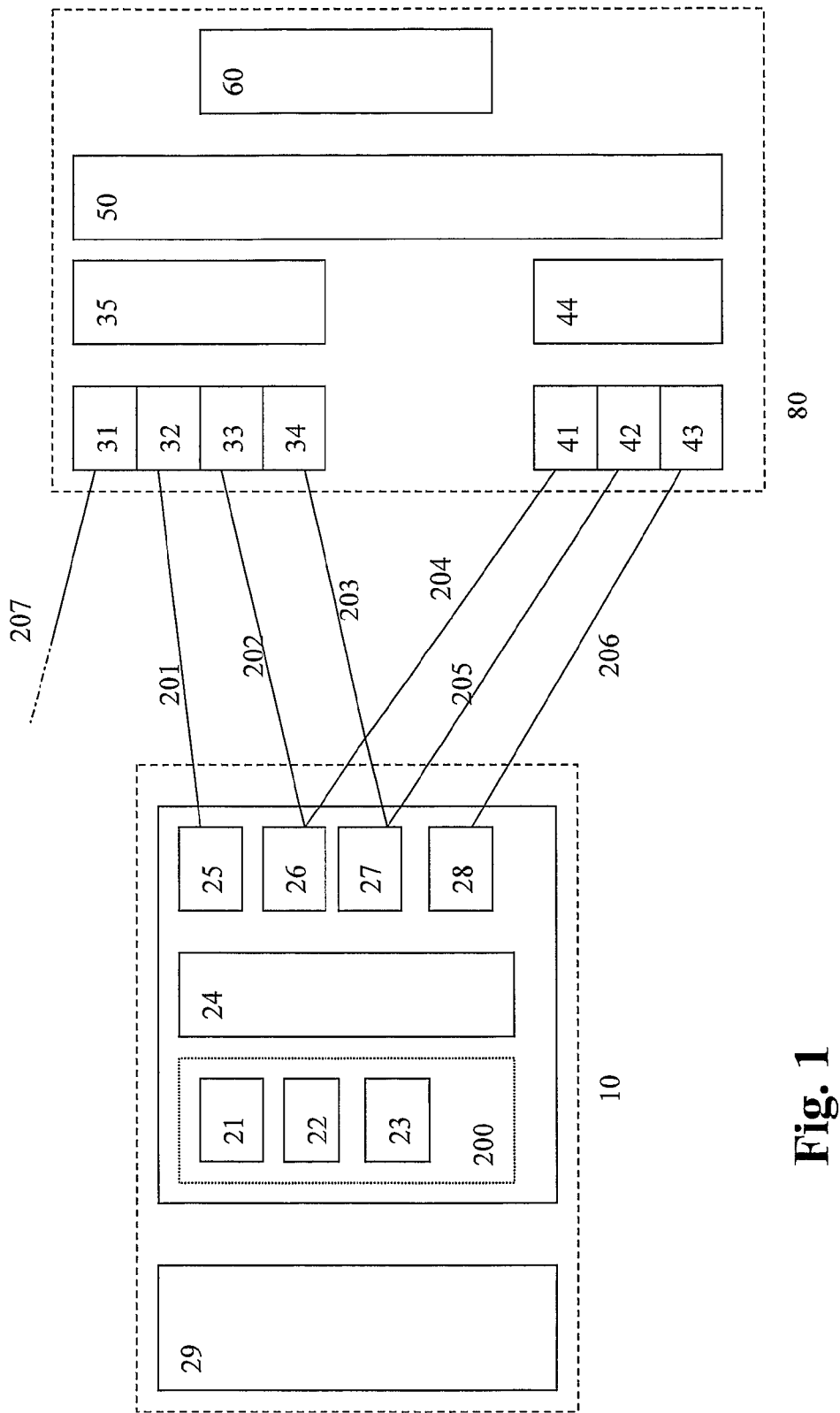
FIG. 1 shows a schematic representation of an embodiment of the present invention.
Figure 2:
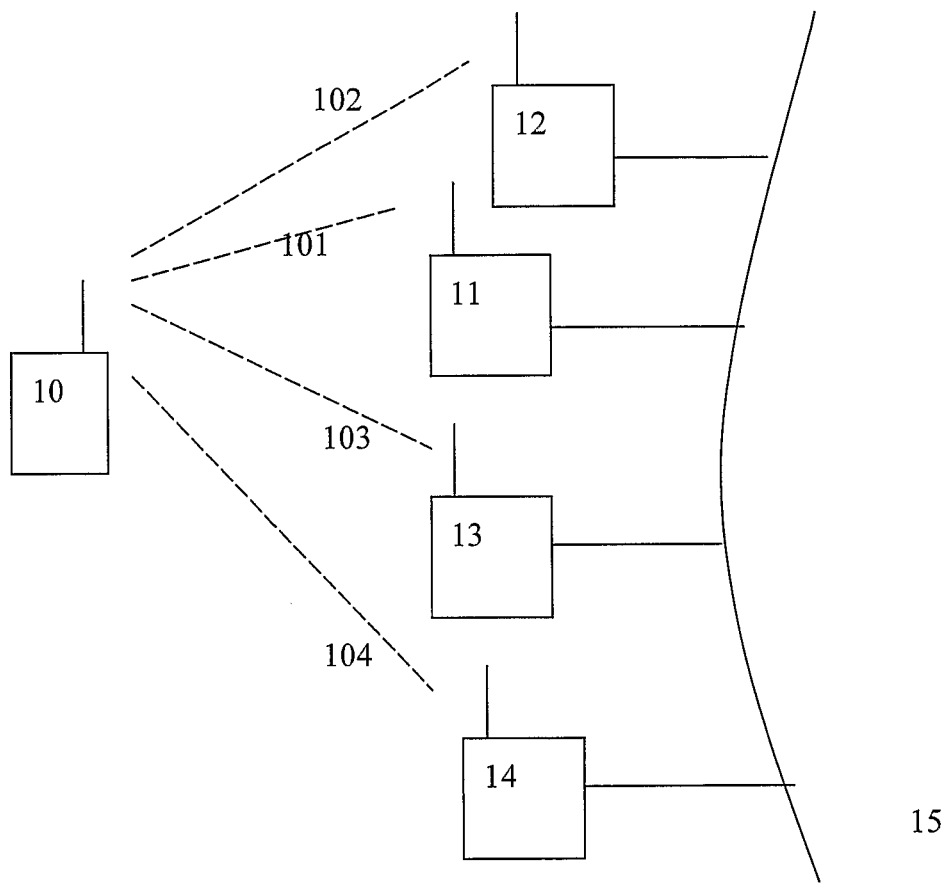
FIG. 2 shows an arrangement of a communication system that can communicate with a network via a plurality of access paths.

FIG. 1 shows an embodiment of the present invention, where the inventive concept is applied to an ambient network scenario. Reference numeral 10 describes a communication system, which can be a single unit, like a mobile telephone device, or can be a system of distributed entities, like a personal area network. The communication system 10 is depicted schematically as comprising a plurality of connection entities 25-28, where each connection entity serves to establish one or more communication links in accordance with a different radio access technology. For example, connection entity 25 can be arranged for establishing a WLAN link, connection entity 26 can be arranged for establishing a WCDMA link, connection entity 27 can be arranged for establishing a WIMAX link and connection entity 28 can be arranged for establishing a WINNER link. Naturally, these are only examples, and more or less different wireless access technologies could be provided, and other wireless access technologies could be used instead of those indicated as examples.

The communication system 10 has a Generic Link Layer (GLL) entity 24 and a Multi-Radio Resource Management (MRRM) entity 200. The GLL entity 24 comprises generic functions which enable and facilitate efficient link-layer interworking among the diverse radio accesses 25-28. The concept of GLL is well known in the art, such that a further description is not necessary. The MRRM entity provides a generic functionality for the management of the plurality of radio accesses 25-28. For this purpose, the MRRM entity 200 comprises an access controller 22. In accordance with the embodiment of the invention, an access path monitor 21 is also provided, which is arranged for obtaining status information related to a status of one or more access links 201-206 provided by the communication entities 25-28. The controller 22 in accordance with the embodiment of the invention is arranged in such a way that it can select an access link for a communication session from among the different access links in accordance with a selection procedure and in dependence on the status information provided by the access path monitor 21. The MRRM entity 200 furthermore comprises a modifier 23 arranged for modifying one or both of the monitoring procedure of the access path monitor 21 and the selection procedure of the controller 22 in accordance with a modification procedure and in dependence on decision information. FIG. 1 furthermore shows an entity 29, which schematically summarizes all further entities of the communication system 10 for sending or receiving data. For example, if the communication system 10 is a mobile terminal, such as a mobile telephone device, the entity 29 will comprise well known functions provided above the link layer, such as telephone applications, multi-media applications, etc.

As has already been mentioned above, the communication system 10 can be a unit or a system of distributed entities. Equally, the access path monitor 21, the access controller 22 and the modifier 23 can be provided in a single unit, e.g. in a single programmable processor, or can be individual entities that are distributed over different locations. According to a preferred embodiment, the communication system 10 is a unit, such as a mobile terminal capable of multiple radio access using at least two different radio access technologies, and the monitor 21, controller 22 and modifier 23 are all provided as functions within a programmable processor.

Figure 3:
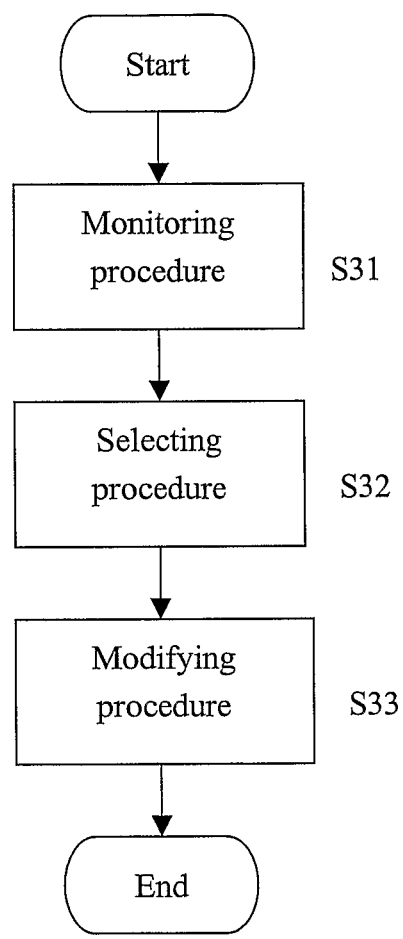
FIG. 3 shows a flowchart of a method embodiment of the present invention.

Expressed as a method, the present invention can be embodied as shown in FIG. 3, where the flowchart shows a monitoring procedure S31 as executed by access path monitor 21, followed by a selection procedure S32 as executed by access controller 22, followed by a modification procedure S33 as executed by modifier 23. Naturally, FIG. 3 is only an example, and the three procedures can also be provided in parallel.

As can be seen from the above, the present invention can be embodied as hardware, software or any suitable combination of hardware and software.

In FIG. 1, communication system 10 can be regarded as an Ambient Network. FIG. 1 shows a second Ambient Network 80, which comprises communication entities 31-34 and 41-43 for establishing links with communication system 10. For example, entity 31 can be associated with the WINNER access technology, entity 32 with WLAN access technology, entity 33 with WCDMA access technology and entity 34 with WiMAX technology. Equally, communication entity 41 can be associated with WCDMA access technology, entity 42 with WiMAX access technology and entity 43 with WINNER access technology. The communication entities 31-34 are associated with a GLL entity 35 and the communication entities 41-43 are associated with a GLL entity 44. In the example of FIG. 1, the two GLL entities 35 and 44 are associated with a common MRRM entity 50. The ambient network 80 furthermore comprises a connection or gateway entity 60 to a communication network (not shown), such as telephone network, an intranet or the Internet.

As an example, the communication entities 31-34 can be associated with one wireless base station and the communication entities 41-43 with another wireless base station. Similar to the description of communication system 10, the ambient network 80 may also be a unit or may be spread out over several locations. Therefore, the just described entities 31-35, 41-44, 50 and 60 may be located together or spread out over several locations and individual networks. It is therefore noted that the representation in FIG. 1 is schematic and oriented along the logical arrangement of entities within a hierarchy of communication layers.

In the example of FIG. 1 link 201 is a WLAN link, links 202 and 204 are WCDMA links, links 203 and 205 are WiMAX links and link 205 is a WINNER link. As an example, the access path monitor 21 can obtain status information related to the status of WLAN link 201 and the status of WCDMA links 202 and 204. In this case WLAN link 201 can be seen as an example of a group of first access paths and WCDMA links 202, 204 as a group of second access paths of a different access technology than the first group.

In the example of FIG. 1, the monitor 21, the access controller 22 and the modifier 23 are shown as parts of system 10. However, it should be noted that one, two or all of entities 21, 22 and 23 can also be provided in the ambient network 80. In this case the entities 10 and 80 together form a communication system that embodies the present invention. For example, the monitor 21 and modifier 23 can be provided in MRRM entity 50 or in one of GLL entities 35 and 44. Equally, the entities 21, 22, and 23 can be spread out over the entities 10 and 80. For example, the monitor 21 could have a part in MRRM entity 200 and a part in MRRM entity 50, and/or parts in the GLL entities 24, 35 and 44. The same applies to the access controller 22 and the modifier 23, i.e. these entities could be spread out in the same way.

The obtaining of information can be done in any suitable or desirable way, e.g. by performing measurements at communication system 10 with respect to desired parameters, such as the signal quality on a link (measured in any suitable or desirable way, e.g. as a bit error rate, a signal strength value, an interference level etc.), a load value (measured in any suitable or desirable way, e.g. as a number of different terminal devices sharing a given link, as a utilization ratio, etc.) etc. On the other hand, the information may also be obtained in other ways e.g. received from the ambient network 80, which may perform measurements and convey the measured information or which may receive such information from the overlying communication network.

The status information can be expressed in any suitable or desirable way, e.g. it can be qualitative information such as a message indicating "link not available" or it can be quantitative information such as the numerical value of a given parameter.

The selection procedure for selecting an access path for a communication session from among first and second access paths can be chosen in any suitable or desirable way. The present invention is not limited to any particular selection procedure, as the selection procedure can be chosen in dependence on a large number of preferences and strategies.

For example, the selection procedure can consist in selecting the link with the highest quality, or it can consist in choosing the link with the lowest load, or it can consist in choosing the link consuming the least amount of energy, etc. It is noted that in the present invention, the selecting of an access path can consist in selecting one access path for carrying a communication session, or can consist in selecting a plurality of access paths for carrying one communication session. As an example, in FIG. 1 a session may be carried over any one of links 201-206, or over more than one of said links simultaneously, e.g. a part of a session may be carried over WLAN link 201 and another part over WCDMA link 204.

The selection procedure can comprise the initial selection of an access path for a new session, and preferably also comprises the possibility of switching an established communication session between access paths of different access technologies while the communication session is active.

For example, in FIG. 1 the access controller 22 can be arranged to perform a selection procedure such that an active session can be switched from e.g. WCDMA link 204 to WLAN link 201 based on obtained status information, e.g. when the signal quality on link 204 falls below a threshold, when the load on link 201 falls below a predetermined threshold or when the link quality on link 201 exceeds that on link 204 and link 201 is available.

The modification procedure can be chosen in any suitable or desirable way in view of a desired strategy and a desired objective. The decision information used by the modifier 23 in the modification procedure will equally depend on the desired strategy or objective. This will become readily understandable from the examples in the following description.

In a general sense, the modifying of a procedure (one or both of the selection procedure and the monitoring procedure) can comprise changing parameters used by the procedure (such as e.g. changing the frequency with which the monitoring procedure obtains status information, changing the frequency with which the access path monitor forwards obtain status information to the access controller, or changing the frequency with which the selection procedure takes a selection decision) or the modifying can also consist in adapting the process of the procedure itself. The latter can e.g. be done by having a procedure which comprises a plurality of subroutines or modes, and letting the modification procedure choose a subroutine or mode. As an example of the latter, a monitoring procedure can be envisioned in which in a first mode a large number of access paths is measured at a high frequency, such that this mode is energy intensive, and in a second mode less access paths are measured at a lower frequency, i.e. the second mode is less energy intensive. Then, depending on associated decision information, such as the energy status of the communication system (e.g. the battery status), an appropriate monitoring mode can be chosen. In other words, if the energy status of the communication system is low (i.e. below a predetermined threshold), then the mode that consumes less energy is chosen, whereas if the energy status of the communication system is high (i.e. above a predetermined threshold), the mode with greater energy consumption is chosen.

As already mentioned, the modifying of the monitoring procedure and/or selection procedure may comprise modifying the frequency with which status information is obtained and/or modifying the frequency with which the status information is forwarded from the access path monitor to the access controller and/or modifying the frequency at which the selection procedure takes a selection decision. The frequency of obtaining status information, e.g. the frequency of performing measurements on the access paths under observation, and the frequency with which status information is forwarded, is a measure of the amount of energy, processing power and signalling overhead invested in the monitoring and selecting operation. As a consequence, if it is desired to reduce this invested effort under certain situations, then the decision information is chosen to be able to judge the presence or absence of the certain situation (e.g. the certain situation can be a low power status of the communication system or a high processor load, and the decision information is then appropriately chosen, e.g. the power status of the communication system or the processor status), and if the certain situation is present, then one or both of the above-mentioned frequencies can be reduced. On the other hand, if the monitoring or selection procedure are adjusted to expend little effort, the determination that the above-mentioned certain situation is no longer present can be used as a basis for modifying one or both of the monitoring procedure and selection procedure by increasing one or both of the above-mentioned frequencies.

Alternatively or additionally, modifying the monitoring procedure may also comprise modifying the status information being obtained for one or more of the access paths. For example, this can mean changing the type of information, such as going from one type of information to another, or adding a new type of information in addition to the old type. For example, if the access path monitor 21 in FIG. 1 is obtaining signal quality information for link 201, a modification of the monitoring procedure can consist in switching to monitoring load information, or can consist in additionally monitoring load information.

Additionally or alternatively, modifying the monitoring procedure may comprise modifying the number of access paths for which status information is obtained. As an example, if it is desirable to reduce the effort expended on monitoring access paths, then the number of access paths being observed can be reduced. The modification procedure may furthermore be arranged such that the selecting procedure is modified by modifying the number of access paths from among which an access path for a communication session is selected. In other words, the selecting procedure may be such that a selection is not performed for all available access paths but only from a limited set. For example, in FIG. 1 the selection procedure performed by access controller 22 could be such that only links 201, 202 and 204 are considered for selection, although further links are available. In accordance with the present embodiment, the modification procedure can comprise increasing or reducing the access paths considered for selection. In keeping with the just mentioned example, the selection procedure could be modified by removing link 202 from the set of links considered for selection, such that a selection is only performed between link 201 and link 204, if it is desired to reduce the amount of effort expended on the selection operation. It is noted that the modification of the selection operation can go so far as to reduce the set of access paths under consideration to one, thereby effectively disabling the selection operation. Equally, modifying the number of access paths being monitored by the monitoring procedure can also reduce this number to one or zero, thereby effectively disabling the monitoring procedure.

The modifying of the monitoring procedure or selection procedure by modifying the corresponding number of access paths under consideration will now also be explained with respect to an example known from the above-mentioned document IST-2002-507134-AN/WP2/D02 on Ambient Networks. In connection with Ambient Networks and a plurality of radio access links it is known to define a plurality of sets:

a Detected Set (DS), which is the set of all access links that are available and to which an ambient network could potentially connect. Some of the access links may actually not have been detected by measurements but can be known due to context information, i.e. it can be known from a MRRM entity that at a certain position a certain radio access is available (such as a WLAN hotspot at e.g. an airport). Such radio accesses can be announced by means of radio access advertisement messages.

a Candidate Set (CS), which is a subset of the detected set, and can be used by an ambient network to connect to one or more other networks. The detected set can contain radio accesses, which are not part of the candidate set. These radio accesses can e.g. be rejected for a given Ambient Network due to policy reasons or due to technical limitations of the access network to use a certain radio access.

MRRM Active Set (AS), which is a subset of the candidate set. The MRRM active set contains all radio accesses which are actively managed for a certain communication session. There can be different MRRM active sets for different sessions. The MRRM active set contains only elements out of the candidate set which also fulfil predetermined minimum requirements, e.g. in radio link quality or with respect to system load, and also fulfil service specific requirements for the communication session. The latter can be a quality of service requirement (such as data rate, delay, jitter, etc), but can also be security requirements (such as encrypted transmission, authenticated transmission, etc).

GLL active set, which is a subset of MRRM active set. The GLL active set contains a number of radio accesses that may be dynamically assigned to a communication session by one or more GLL entities.

In the example of FIG. 1, the detected set could e.g. be all of links 201-207, where link 207 is indicated as a link not being used by communication system 10 but available. The candidate set could e.g. be links 202-206 while the MRRM active set could e.g. be links 203-206. Finally, the GLL active set could e.g. be links 204-206, which are all associated with the GLL entity 44.

In a communication system using the above-mentioned sets of access links or access paths, the modification procedure can comprise changing the links or paths in one or more of any of the above-mentioned sets. For example, the modification of the monitoring procedure may comprise changing the number of links or paths in the MRRM candidate set, and the modifying of the selecting procedure may comprise changing the number of links or paths in the GLL active set.

As already mentioned previously, the decision information used by the modifier for modifying one or both of the monitoring procedure and the selection procedure can be chosen in any suitable or desirable way, depending on the desired objective and strategy.

According to one example, the decision information can at least partially be derived from the status information that is being obtained by the monitoring procedure. As an example, the status information can comprise measurements of the signal quality on the access path currently being used for carrying the communication session, and measurements of signal quality on further accessible links. This signal quality information can be used as decision information by the modification procedure in the following way. If the signal quality on the currently used access path exceeds a predetermined threshold, then the monitoring procedure and selection can be disabled, whereas if the signal quality is below the threshold, then the monitoring procedure and selection procedure are activated.

The decision information can be identical to the status information, or the status information can be processed for deriving the decision information. For example, if the status information is a parameter, then the temporal change rate (time differential) of said parameter can also be used as decision information.

As with the status information, the decision information can also be of any desirable type i.e. it can be qualitative, such as a message indicating "link not available", or it can be qualitative, like a numerical value. According to a preferred embodiment, the decision information comprises numerical values. More preferably, the numerical values comprise values of one or more decision parameters. Examples of such decision parameters can be the previously mentioned status parameters, such as signal quality or load on an access path. The modification procedure can then comprise comparing parameter values associated with one of the decision parameters with a respective threshold. For example, if the signal quality value on the currently used access path is above a predetermined quality threshold and/or the load on the currently used access path is below a predetermined load threshold, then the modification procedure can appropriately modify the monitoring procedure and/or selection procedure, e.g. by reducing the frequency of obtaining information on monitored access paths (up to disabling the monitoring procedure) and by reducing the number of access paths considered for selection (up to disabling the selection procedure).

Another example of numerical values comprised in the decision information are change rate values of one or more of the mentioned decision parameters. These change rate values derived from a given decision parameter can be compared with a respective threshold as a part of the modification procedure. For example, if the time differential of the signal quality on the currently used access path is below a quality change rate threshold, and/or the time differential of the load on the currently used access path is below a predetermined load change rate threshold, then the modification may comprise reducing the effort expended on performing the monitoring procedure and/or selection procedure, e.g. by reducing the rate of obtaining status information for the access paths of the different access technologies.

As can be seen from the above examples, the decision information may comprise a traffic load indication. This indication can be a quantitative or qualitative information, and it can be indicative of the traffic load on an individual path or the traffic load in a larger context, e.g. the traffic load in an entire Ambient Network under consideration. The decision information can also comprise information derived from the traffic load indication, such as the time differential of traffic load values.

The decision information can also comprise a signal quality indication, which can be a qualitative or quantitative information. The signal quality indication can be indicative of the signal quality on the one or more currently used access paths for a communication session, or of the signal quality on access paths being monitored. The decision information can also comprise information derived from the signal quality indication, such as the time derivative of signal quality values. As an example, if it is determined that the change rate of signal quality on access paths being monitored falls below a predetermined threshold, then the modification procedure can reduce the frequency with which status information is obtained, as a high frequency is not necessary.

Additionally, or alternatively, in the event that the communication system is mobile, the decision information may comprise an indication of the velocity of the communication system. If the communication systems velocity falls below a predetermined threshold, then the modification procedure can adjust the monitoring procedure and/or selection procedure in such a way as to reduce the effort expended on monitoring and selecting access paths. Namely, if the communication system is only moving very slowly or not moving at all, then there is less expected benefit in the monitoring and selection procedures, such that it can be desirable to reduce the expended effort.

Alternatively or additionally the modification procedure can be such that the decision information comprises an indication of resources available to the communication device. Such resources can e.g. be power resources (such as the battery power level) or processing resources (such as the degree to which a processor is being utilized). As indicated previously, in the event that the available resources are low (e.g. low power or little free processing capacity), the modification procedure may modify the monitoring procedure and/or selection procedure in such a way as to reduce the expended effort, e.g. by reducing the frequency with which status information is obtained.

As already mentioned in the summary of invention, the choice of the modification procedure and the associated decision information can be done in view of an implicit analysis of costs and/or benefits or a balancing of implicit costs and benefits. However, the decision information may also comprise the use of explicit cost and/or benefit values. Namely, the decision information may comprise one or both of estimated benefit values and estimated cost values for a plurality of different settings of the monitoring procedure. Equally, the decision information may comprise one or both of estimated benefit values and estimated cost values for a plurality of different settings of the selection procedure. An example of a cost function for monitoring a plurality of access paths is:

$$C_{Monitor} = \sum_i f_{Monitor,i} \cdot c_{Monitor,i} \tag{1}$$

where $C_{Monitor}$ is the monitoring cost, $f_{Monitor,i}$ is the frequency of monitoring access path i and $c_{Monitor,i}$ is the cost for monitoring access path i. The sum runs over all access paths i being monitored. The cost $c_{Monitor,i}$ can be expressed in any suitable or desirable way, i.e. can be a dimensionless variable or can be expressed in terms of a parameter, such as in terms of consume energy. Similarly to equation (1), the costs for signalling the status information for the access path monitor to the access controller can be expressed as:

$$C_{Forward,i} = \sum_i f_{Forward,i} \cdot c_{Forward,i}, \tag{2}$$

where $f_{Forward,i}$ is the frequency of forwarding status information for access path i and $c_{Forward,i}$ is the cost of forwarding status information for access path i.

Similar functions can be formulated for the costs of performing the selection operation, or for the benefits of performing the monitoring procedure and/or the selection procedure.

As an example, the modification procedure can be such that the monitoring cost is calculated in accordance with equation (1), and if the total cost $C_{Monitor}$ exceeds a predetermined threshold, then the monitoring frequencies $f_{Monitor,i}$ are changed to make $C_{Monitor}$ again fall below the threshold.

It is noted that costs and/or benefits can be determined in accordance with mathematical functions as given in above examples (1) and (2), but can also e.g. be determined on the basis of multi-dimensional tables or mappings where a cost value and/or a benefit value is assigned to a vector of input parameter values, such as a vector of the frequency value of monitoring, the number of access paths being monitored, etc. As a further alternative or addition, the decision information used by the modifier may comprise preference information set by one or both of a user of the communication system and an operator of the network. For example, the user of the communication system may have a preference for a certain access technology, and the modifier can be arranged to modify the monitoring procedure in such a way that access paths of said preferred access technology are always monitored if available.

As a further alternative or addition, the modifier can be arranged such that the decision information comprises an indication of the momentary sensitivity of the selecting procedure to a timeliness of the status information. When monitoring access paths and performing a selection procedure there is the problem that a delay occurs between the gathering of the status information and the use of said status information in the selection procedure. This delay is caused by the time required for obtaining the status information, and the time necessary for forwarding the status information from the access path monitor to the access controller. Furthermore, the delay depends on the frequency with which status information is obtained and the frequency at which the status information is forwarded from the access monitor to the access controller. Namely, if status information for a given access path being monitored only arrives every Δt the access controller, then at the end of the period Δt the momentary status may have already changed considerably. The momentary sensitivity of the selecting procedure can therefore be an important parameter in modifying one or both of the monitoring procedure and the selection procedure. For example, if it is determined that the momentary sensitivity is above a predetermined threshold, then the modification procedure can modify the monitoring procedure by increasing the frequency of obtaining status information, and vice versa if the momentary sensitivity is below a predetermined threshold, then the modification procedure can reduce the frequency at which status information is obtained. The sensitivity can be e.g. be indicated in terms of the differential of a mathematical selection function with respect to the input status parameter values.

As a further alternative or addition, the modifier can be arranged such that said modification procedure comprises a determination of whether one or more service requirements are fulfilled for the communication session. The service requirement can be chosen in any suitable or desirable way, e.g. it can be a data rate value or some other quality of service measure. The criterion for fulfillment is set by defining an associated threshold accordingly. As an example, if the communication session of a user of the communication system is a voice communication, a data rate threshold of e.g. 50 kbit/s can be considered sufficient, such that if the momentary access path or paths provide this data rate, even if a new access path is available that has a higher data rate, there is no benefit in switching to it. As a consequence, the modifier can modify the monitoring procedure and/or the selecting procedure in such a way that the effort expended is reduced if the service requirement is fulfilled, e.g. by disabling the monitoring procedure and the selecting procedure if the threshold data rate is exceeded by the momentary access path(s).

The present invention is generally concerned with making the monitoring procedure and/or the selection procedure of a communication system that can access a network via access path of different access technology dynamically adaptable or modifiable, in order to be able to dynamically adjust the trade-off between an effort expended for performing the monitoring and selecting with respect to the benefit derived therefrom. Generally, the balance between cost and benefit is such that when the expected benefit decreases, the expended effort for monitoring and selecting can be decreased and vice versa. For example, if the monitoring procedure is operated to less frequently obtain status information (e.g. by less frequently performing measurements), this reduces the amount of signalling overhead and reduces energy consumption. At the same time, the selection procedure must make decisions based on less timely status information, which can reduce the benefit of performing the selection procedure.

As already indicated in some of the examples above, the access path monitoring (monitoring procedure) and access controller (selection procedure) can be modified in view of one or more of the following input parameters:

traffic load and experienced rate of change in traffic load. If the traffic load is below a predetermined threshold and/or the rate of change of traffic load is below a threshold, then the monitoring frequency can be reduced.

access path quality and experienced rate of change in access path quality. If the access path quality is above a predetermined threshold and/or the rate of change of access path quality is below a predetermined threshold, then the monitoring frequency can be reduced.

a number of users in the environment. If few users are in the environment, the benefit of multi-user diversity is low. In this case a diversity gain can be achieved by selecting the access path based on instantaneous access path quality. If many users are present, little diversity gain can be achieved. The diversity gain is a type of benefit. As a consequence, depending on the number of users in the environment of the communication system, the selection procedure can be modified, e.g. the number of access paths considered in the selection procedure is reduced if the number of users in the environment increases beyond a predetermined threshold, and the monitoring procedure is accordingly also modified to provide the appropriate status information.

if multiple access paths are available, they can be classified into different sets, as explained previously with respect to the Detected Set, Candidate Set, MRRM Active Set and GLL Active Set. Depending on the set to which an access path belongs, the frequency with which status information is obtained can be adapted.

performance desired by user. An example of a user preference is an indication of the desired performance, e.g. a desired quality of service (QoS) or a desired data rate. If the user achieves the desired performance, then the effort expended on the monitoring procedure and selection procedure can be reduced.

performance allowed by network. If a user achieves the performance he is allowed by the network, e.g. in terms of quality of service or data rate, then the effort expended on the monitoring procedure or selection procedure can be reduced.

battery power of communication system. If the battery of the communication system is low, then the frequency for obtaining status information in the access path monitor can be reduced, the frequency for forwarding status information to the access controller can be reduced, and the processing expended for the selection procedure can be reduced. As an example, both the monitoring procedure and the selection procedure can be effectively disabled if the battery power falls below a predetermined threshold value.

system resources. The conducting of a selection procedure generally improves the efficient use of system resources, both in the communication system and in the network. However, if enough system resources are already available (i.e. the value of an appropriate system resource measure is above a predetermined threshold), then the effort expended on the monitoring procedure and the selection procedure can be reduced, e.g. by reducing the frequency which status information is obtained.

user behaviour. If the communication system is mobile and a user of the communication system is moving faster than a predetermined velocity threshold, the status parameters may vary rapidly. As a consequence, it can be desirable in this case to increase the frequency at which status information is obtained, in order to have timely status information.

The strategies and desired objectives when modifying the frequency at which status information is obtained and the frequency at which status information is forwarded can be manifold. In this connection, one can for example consider a service criterion, a resource criterion or an MRRM performance criterion. The service criterion defines to what extent the requirements of the service and/or the user are met. An example of a service criterion is: is the minimum quality of service threshold achieved? Another example is: is a higher quality of service level required or desired? For example, is an access path having higher resolution or higher rate available for streaming? Or as another example, is the additional cost (e.g. in monetary terms) worth the increase in service performance?

A resource criterion defines to what extent transmission resources are critical. Examples are: are system resources highly utilized (e.g. high load) and how many resources remain available? Is the battery power low?

The MRRM performance criterion relates to what the estimated benefit or gain of Multi-Radio Resource Management is. In several studies a number of MRRM algorithms have been studied to select a radio link for a user connection. Input parameters can be link quality, service requirements, system load, etc. It has been shown that these algorithms can provide everything from substantial gains in performance to only very small gains. The gain or benefit depends on many aspects: what radio access technologies are used, what deployment patterns are used, how the traffic demand is distributed with respect to the areas of service (e.g. radio cells), what are the service requirements, what input parameters are used for the selection procedure and which selection algorithms are used, how many users are in the system (e.g. due to variations of link quality, a selection procedure can provide a multi-access diversity gain. For a large number of users there is a multi-user diversity gain, which exploits channel variations. If a large multi-user diversity gain is achieved, little additional gain remains for access selection diversity), what costs (in terms of any desired measure) are involved for performing the monitoring procedure and to what extent does this use up the achieved or achievable benefit/gain, what is the position of the MRRM input parameter(s). In this respect, the precision of estimation, the delay of distributing measurements and the degree of variability in the system (variation of load and link quality, e.g. caused by the users mobility) play a role.

As explained in connection with Ambient Networks, a number of sets can be defined on which different MRRM functions are performed. Most of these functions require a monitoring procedure for obtaining status information. Within the detected set and candidate set, monitoring provides occasional information about information elements like link quality, load etc. Based on this monitoring input, an access path can be moved to the MRRM/GLL active set. Within the active set, MRRM performs selection and allocation of access paths to user sessions. In order to achieve this, it is desirable to have a more precise monitoring procedure, e.g. status information is obtained more frequently and/or more different types of status information are obtained. The following examples are further embodiments of the invention in this context:

Based on the service criterion, resource criterion and/or MRRM performance criterion, it can be decided to what extent a selection procedure in MRRM is feasible. If there is no problem, or little benefit expected, then the expended effort can be kept low. For example, the size of the active set and candidate set can be held to a predetermined small number. If the active set size is limited to one, no selection procedure is effectively performed. Also, the number of alternative access paths in the candidate set can be limited in a similar way.

If a selection procedure is performed across a number of access paths (e.g. the active set contains several elements), the appropriate access selection algorithm can be chosen depending on system parameters like access path quality, service, load, or combinations thereof. The access selection frequency can be adapted according to the sensitivity of input parameters of the access selection function and the dynamic variations of system parameters. For example, the gain or benefit of MRRM decreases if outdated input parameters (e.g. measured load or link quality values) are used. At the same time, the consumed resources for the monitoring procedure decrease. If the variability of the system increases, then it is desirable to also increase the frequency at which status information is obtained and/or at which access paths are selected.

It may be noted that many of the above examples referred to the embodiment shown in FIG. 1. Although FIG. 1 constitutes a preferred embodiment of the invention, the present invention is by no means restricted thereto. For example, the present invention is not restricted to being applied in a communication system that accesses a network via a group of first radio access links of a first technology and a group of second radio access links of a second access technology different from the first access technology. Namely, the invention also applies to the more general case of access paths that may be multi-hop relay links. Furthermore, the access paths do not have to be radio access paths, as the invention equally applies to the case of wire-bound access paths of differing access technology.

As the present invention is not restricted to the field of wireless communication, it can also be applied in the area of media routing. Overlay networks can be used to transmit data to a receiver via different networks. A Media Port makes a routing decision of selecting the right network. For this, the Media Port obtains monitoring information about the status (e.g. load) and capabilities of the different networks. This can also be considered as a monitoring procedure within the meaning of the present invention. The monitoring procedure in this case evaluates a complete sub-network. It can consist of measurement procedures (link ping packet trains), end-user quality of service reports or feedback information of sub-network-specific management functions.

Although the present invention has been described with reference to preferred embodiments, these only serve to illustrate the invention, but are by no means restrictive. The invention is defined by the appended claims. Reference signs serve to make the claims easier to read but do not have any limiting effect.

The invention claimed is:

1. A communication system, comprising:
    connection entities arranged for accessing a network via a group of first access paths of a first access technology and a group of second access paths of a second access technology different from said first access technology,
    an access path monitor for obtaining status information related to a status of one or more of said first access paths and one or more of said second access paths in accordance with a monitoring procedure,
    an access controller for selecting an access path for a communication session from among said first and second access paths in accordance with a selection procedure and in dependence on said status information,
    a modifier for modifying one or both of said monitoring procedure and said selection procedure in accordance with a modification procedure and in dependence on decision information, wherein said decision information comprises an indication of resources available to said communication system, and wherein the resources include at least one of a battery power level and a processing capacity;
    wherein modifying said monitoring procedure comprises modifying a frequency with which said status information is obtained; and
    wherein modifying said monitoring procedure comprises modifying a frequency with which said status information is forwarded from said access path monitor to said access controller.

2. The communication system according to claim 1, wherein said access controller is arranged for switching said communication session between said first and second access paths while said communication session is active.

3. The communication system according to claim 1, wherein modifying said monitoring procedure comprises modifying the status information being obtained for one or more of said access paths.

4. The communication system according to claim 1, wherein modifying said monitoring procedure comprises modifying the number of access paths for which status information is obtained.

5. The communication system according to claim 1, wherein modifying said selecting procedure comprises modifying the number of access paths from among which an access path for a communication session is selected.

6. The communication system according to claim 1, wherein said decision information is at least partially derived from said status information.

7. The communication system according to claim 1, wherein said decision information comprises numerical values.

8. The communication system according to claim 7, wherein said numerical values comprise values of one or more decision parameters.

9. The communication system according to claim 8, wherein said modification procedure comprises comparing parameter values associated with one of said decision parameters with a respective threshold.

10. The communication system according to claim 7, wherein said numerical values comprise change rate values of one or more decision parameters.

11. The communication system according to claim 10, wherein said modification procedure comprises comparing change rate values associated with one of said decision parameters with a respective threshold.

12. The communication system according to claim 1, wherein said decision information comprises a traffic load indication.

13. The communication system according to claim 1, wherein said decision information comprises a signal quality indication.

14. The communication system according to claim 1, wherein said communication system is mobile and said decision information comprises an indication of a velocity of said communication system.

15. The communication system according to claim 1, wherein said decision information comprises an indication of resources available to said communication system.

16. The communication system according to claim 1, wherein said decision information comprises one or both of estimated benefit values and estimated cost values for a plurality of different settings of said monitoring procedure.

17. The communication system according to claim 1, wherein said decision information comprises one or both of estimated benefit values and estimated cost values for a plurality of different settings of said selection procedure.

18. The communication system according to claim 1, wherein said decision information comprises preference information set by one or both of a user of said communication system and an operator of said network.

19. The communication system according to claim 1, wherein said decision information comprises an indication of the momentary sensitivity of said selecting procedure to a timeliness of said status information.

20. The communication system according to claim 1, wherein said modifier is arranged such that said modification procedure comprises a determination of whether one or more service requirements are fulfilled for said communication session.

21. A modifier for modifying one or both of a monitoring procedure of an access path monitor and a selection procedure of an access controller, arranged for operating in a communication system according to claim 1.

22. The communication system according to claim 1, wherein the communication system is a mobile telephone.

23. The communication system according to claim 1, wherein the communication system is a personal area network.

24. The communication system according to claim 1, wherein said modifier dynamically adapts at least one of the monitoring procedure and the selection procedure by balancing a cost expended for performing the at least one of the monitoring procedure and the selection procedure with respect to a benefit derived therefrom.

25. A method in a communication system of controlling access to a network via a group of first access paths of a first access technology and a group of second access paths of a second access technology different from said first access technology, the method comprising:
    obtaining, by an access path monitor, status information related to a status of one or more of said first access paths and one or more of said second access paths in accordance with a monitoring procedure, selecting, by an access controller, an access path for a communication session from among said first and second access paths in accordance with a selection procedure and in dependence on said status information, modifying, by a modifier, one or both of said monitoring procedure and said selection procedure in accordance with a modification procedure and in dependence on decision information, wherein said decision information comprises an indication of resources available to said communication system, and wherein the resources include at least one of a battery power level and a processing capacity;

wherein modifying said monitoring procedure comprises modifying a frequency with which said status information is obtained; and wherein modifying said monitoring procedure comprises modifying a frequency with which said status information is forwarded from said access path monitor to said access controller.

26. The method according to claim 25, wherein said modifying step dynamically adapts at least one of the monitoring procedure and the selection procedure by balancing a cost expended for performing the at least one of the monitoring procedure and the selection procedure with respect to a benefit derived therefrom.

27. A non-transitory computer recordable-type medium within a communication system, wherein the non-transitory computer recordable-type medium has an executable computer program product stored thereon, wherein the computer program product instructs the communication system for controlling access to a network via a group of first access paths of a first access technology and a group of second access paths of a second access technology different from said first access technology, the computer program product comprising:

instructions within the computer usable medium for obtaining by an access path monitor status information related to a status of one or more of said first access paths and one or more of said second access paths in accordance with a monitoring procedure, instructions within the computer usable medium for selecting by an access controller an access path for a communication session from among said first and second access paths in accordance with a selection procedure and in dependence on said status information, instructions within the computer usable medium for modifying by a modifier one or both of said monitoring procedure and said selection procedure in accordance with a modification procedure and in dependence on decision information, wherein said decision instructions within the computer usable medium for information comprises an indication of resources available to said communication system, and wherein the resources include at least one of a battery power level and a processing capacity;

wherein modifying said monitoring procedure comprises modifying a frequency with which said status information is obtained; and wherein modifying said monitoring procedure comprises modifying a frequency with which said status information is forwarded from said access path monitor to said access controller.

28. A communication system, comprising:

connection entities arranged for accessing a network via a group of first access paths of a first access technology and a group of second access paths of a second access technology different from said first access technology, an access path monitor for obtaining status information related to a status of one or more of said first access paths and one or more of said second access paths in accordance with a monitoring procedure, an access controller for selecting an access path for a communication session from among said first and second access paths in accordance with a selection procedure and in dependence on said status information, and a modifier for modifying one or both of said monitoring procedure and said selection procedure in accordance with a modification procedure and in dependence on decision information, wherein said decision information comprises an indication of resources available to said communication system, and wherein the modification changes:

a frequency with which the monitoring procedure obtains status information; and a frequency with which the access path monitor forwards the obtained status information to the access controller.

* * * * *

UNITED STATES PATENT AND TRADEMARK OFFICE
CERTIFICATE OF CORRECTION

PATENT NO. : 8,891,510 B2  
APPLICATION NO. : 11/997690  
DATED : November 18, 2014  
INVENTOR(S) : Sachs et al.

It is certified that error appears in the above-identified patent and that said Letters Patent is hereby corrected as shown below:

On the Title Page, in Item (75), under "Inventors", in Column 1, Line 2, delete "Linkoping" and insert -- Linköping --, therefor.

On the Title Page, in Item (75), under "Inventors", in Column 1, Line 3, delete "Ronninge" and insert -- Rönninge --, therefor.

On the Title Page, in Item (75), under "Inventors", in Column 1, Line 4, delete "Spanga" and insert -- Spånga --, therefor.

In the Claims

In Column 11, Line 41, delete "Δt" and insert -- Δt at --, therefor.

Signed and Sealed this  
Seventeenth Day of November, 2015

Michelle K. Lee  
*Director of the United States Patent and Trademark Office*